US007953176B2

(12) United States Patent
Roh

(10) Patent No.: US 7,953,176 B2
(45) Date of Patent: May 31, 2011

(54) METHOD FOR TRANSMITTING CHANNEL STATE INFORMATION IN MULTIPLE ANTENNA SYSTEM

(75) Inventor: Dong Wook Roh, Seoul (KR)

(73) Assignee: LG Electronics Inc., Seoul (KR)

( * ) Notice: Subject to any disclaimer, the term of this patent is extended or adjusted under 35 U.S.C. 154(b) by 456 days.

(21) Appl. No.: 12/064,219

(22) PCT Filed: Apr. 4, 2007

(86) PCT No.: PCT/KR2007/001655
§ 371 (c)(1),
(2), (4) Date: Feb. 19, 2008

(87) PCT Pub. No.: WO2007/114654
PCT Pub. Date: Oct. 11, 2007

(65) Prior Publication Data
US 2009/0016463 A1   Jan. 15, 2009

(30) Foreign Application Priority Data

Feb. 2, 2007  (KR) .......................... 10-2007-0010957

(51) Int. Cl.
*H04L 27/00* (2006.01)
(52) U.S. Cl. .......................................... 375/295; 455/69
(58) Field of Classification Search .................. 375/295; 455/69
See application file for complete search history.

(56) References Cited

U.S. PATENT DOCUMENTS

| 7,020,110 | B2 | 3/2006 | Walton et al. | |
| 7,248,638 | B1 * | 7/2007 | Banister | 375/267 |
| 7,321,563 | B2 * | 1/2008 | Kim et al. | 370/252 |
| 7,327,800 | B2 * | 2/2008 | Oprea et al. | 375/267 |
| 7,450,532 | B2 * | 11/2008 | Chae et al. | 370/310 |
| 2003/0060236 | A1 | 3/2003 | Kim et al. | |
| 2003/0128658 | A1 * | 7/2003 | Walton et al. | 370/208 |
| 2003/0134605 | A1 | 7/2003 | Kim et al. | |
| 2003/0139139 | A1 * | 7/2003 | Onggosanusi et al. | 455/63 |
| 2004/0120411 | A1 * | 6/2004 | Walton et al. | 375/260 |
| 2005/0031044 | A1 * | 2/2005 | Gesbert et al. | 375/259 |
| 2005/0170782 | A1 * | 8/2005 | Rong et al. | 455/67.11 |
| 2005/0287978 | A1 * | 12/2005 | Maltsev et al. | 455/403 |
| 2006/0029157 | A1 * | 2/2006 | Dabak et al. | 375/299 |

(Continued)

FOREIGN PATENT DOCUMENTS

EP   1294120   3/2003

OTHER PUBLICATIONS

Roh, "Transmit beamforming in multiple-antenna systems with finite rate feedback: a VQ-based approach", IEEE Transactions on Information Theory, Issue Date Mar. 2006, vol. 52, Issue: 3, pp. 1101-1112, date of Current Version: Mar. 6, 2006.*

(Continued)

*Primary Examiner* — Juan A Torres
(74) *Attorney, Agent, or Firm* — Lee, Hong, Degerman, Kang & Waimey

(57) ABSTRACT

There is provided a method for transmitting channel state information in a wireless communication system. The method includes receiving a pilot signal, obtaining an estimated channel using the pilot signal, obtaining a plurality of bases representing the estimated channel, wherein a basis comprises a plurality of vectors and transmitting a representative vector as channel state information, wherein the representative vector is selected from the plurality of bases.

2 Claims, 9 Drawing Sheets

U.S. PATENT DOCUMENTS

| | | | | |
|---|---|---|---|---|
| 2006/0071807 | A1* | 4/2006 | Sadowsky | 340/825.72 |
| 2006/0209980 | A1* | 9/2006 | Kim et al. | 375/267 |
| 2006/0268623 | A1* | 11/2006 | Chae et al. | 365/189.01 |
| 2007/0191043 | A1* | 8/2007 | Shapira et al. | 455/522 |
| 2007/0258366 | A1* | 11/2007 | Imamura | 370/230 |
| 2008/0069031 | A1* | 3/2008 | Zhang et al. | 370/328 |
| 2008/0108310 | A1* | 5/2008 | Tong et al. | 455/69 |
| 2009/0106619 | A1* | 4/2009 | Onggosanusi et al. | 714/749 |
| 2009/0219838 | A1* | 9/2009 | Jia et al. | 370/278 |

OTHER PUBLICATIONS

Roh, "Multiple antenna channels with partial feedback" IEEE International Conference on Communications, 2003, ICC '03, vol. 5, Publication Year: 2003, pp. 3195-3199 vol. 5.*

Roh, "Performance analysis of multiple antenna systems with VQ-based feedback," Conference Record of the Thirty-Eighth Asilomar Conference on Signals, Systems and Computers, 2004, vol. 2 Publication Year: 2004, pp. 1978-1982 vol. 2.*

Roh, "An improved transmission strategy for multiple antenna channels with partial feedback, "Conference Record of the Thirty-Sixth Asilomar Conference on Signals, Systems and Computers, 2002, Publication Year: 2002, pp. 609-613 vol. 1.*

Roh, "MIMO spatial multiplexing systems with limited feedback" ICC 2005, 2005 IEEE International Conference on Communications, 2005, vol. 2, Publication Year: 2005, pp. 777-782 vol. 2.*

Roh, "Multiple antenna channels with partial channel state information at the transmitter "IEEE Transactions on Wireless Communications, vol. 3, Issue: 2, Publication Year: 2004, pp. 677-688.*

Thomas, "Promising feedback methods for transmit beamforming in broadband mobile OFDM" WCNC 2006, IEEE Wireless Communications and Networking Conference, 2006, Issue Date : Apr. 3-6, 2006, vol. 3 pp. 1239-1244.*

Srinivasa, "The optimality of beamforming: a unified view" GLOBECOM '05, IEEE Global Telecommunications Conference, 2005, vol. 6, Publication Year: 2005, pp. 5 pp. 3486.*

Mukkavilli, "Performance limits on beamforming with finite rate feedback for multiple antenna systems", Conference Record of the Thirty-Sixth Asilomar Conference on Signals, Systems and Computers, 2002, vol. 1, Publication Year: 2002, pp. 536-540 vol. 1.*

Peel, "Downlink transmit beamforming in multi-user MIMO systems "Sensor Array and Multichannel Signal Processing Workshop Proceedings, 2004, Publication Year: 2004, pp. 43-51.*

* cited by examiner

[Fig. 1]
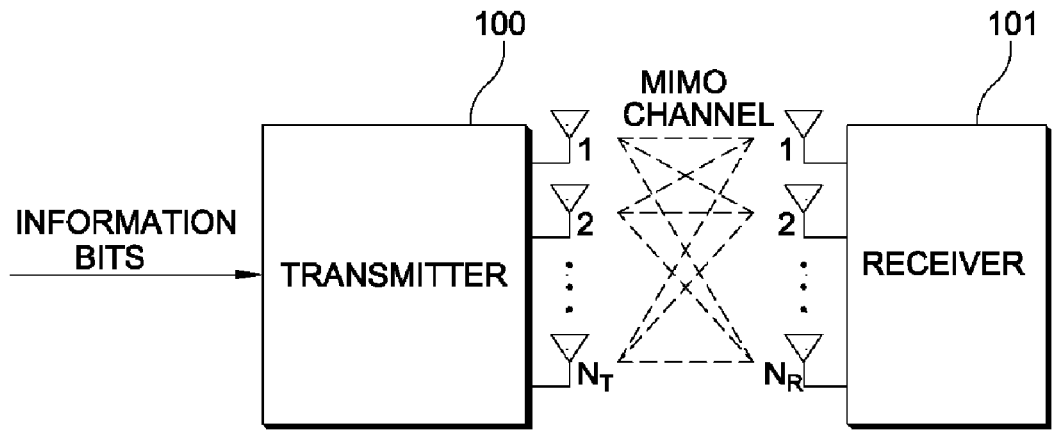
[Fig. 2]
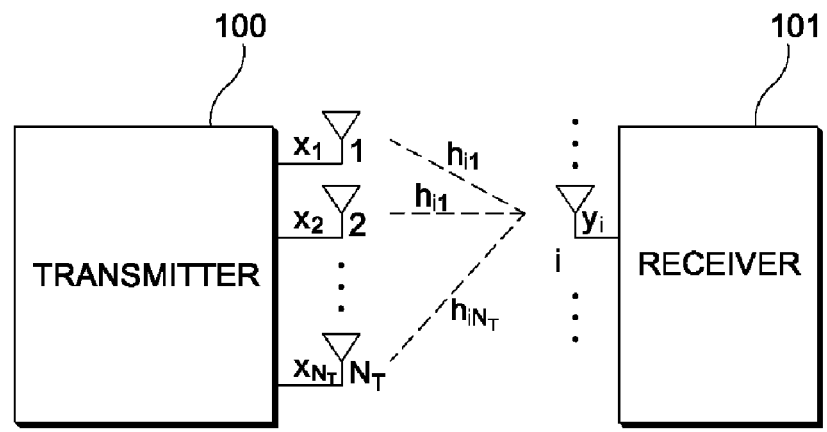
[Fig. 3]
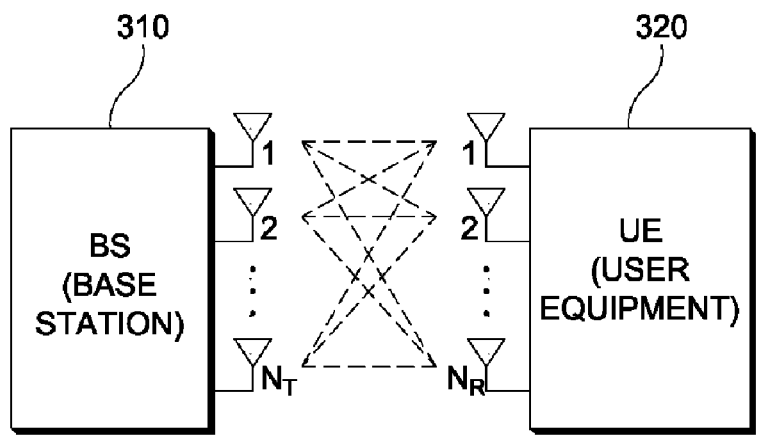

[Fig. 4]
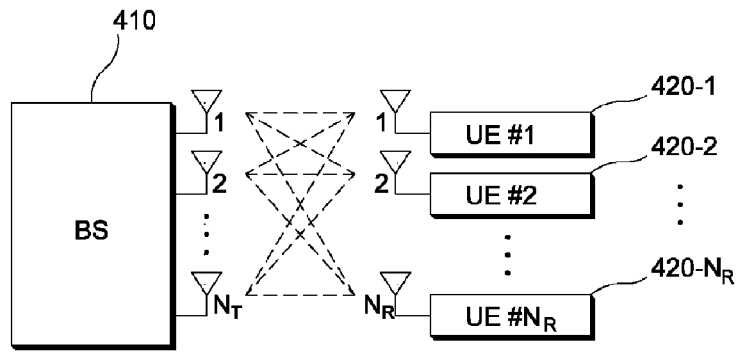
[Fig. 5]
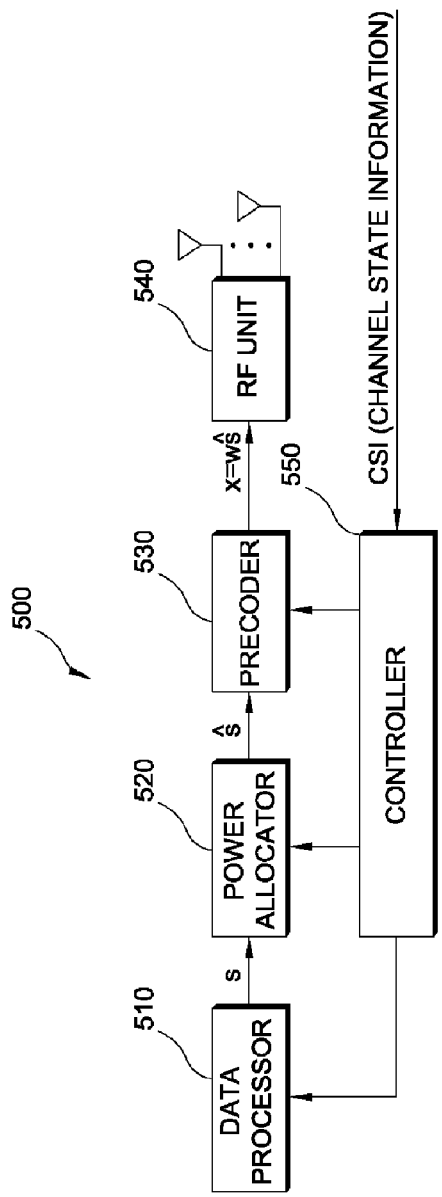

[Fig. 6]
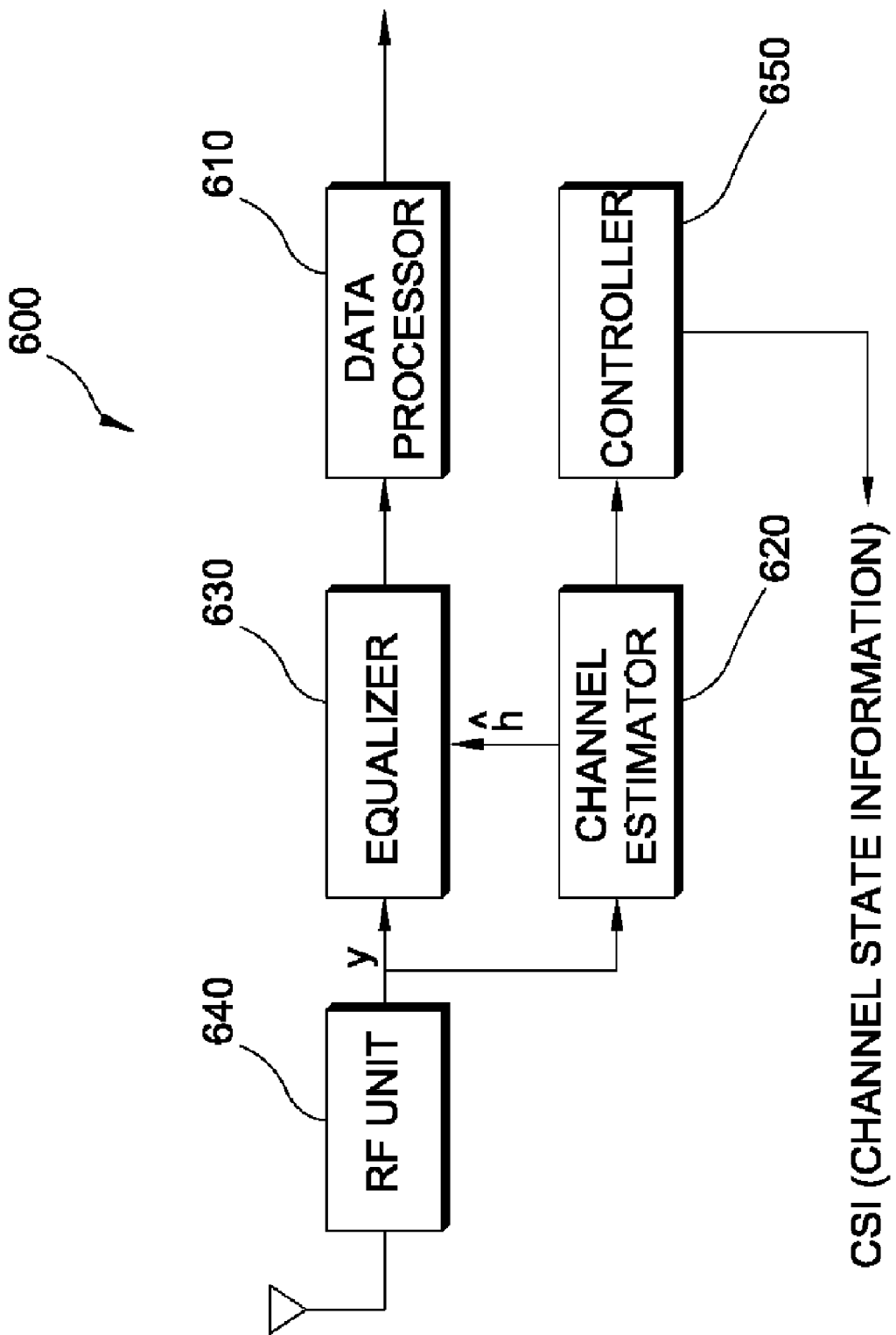

[Fig. 7]
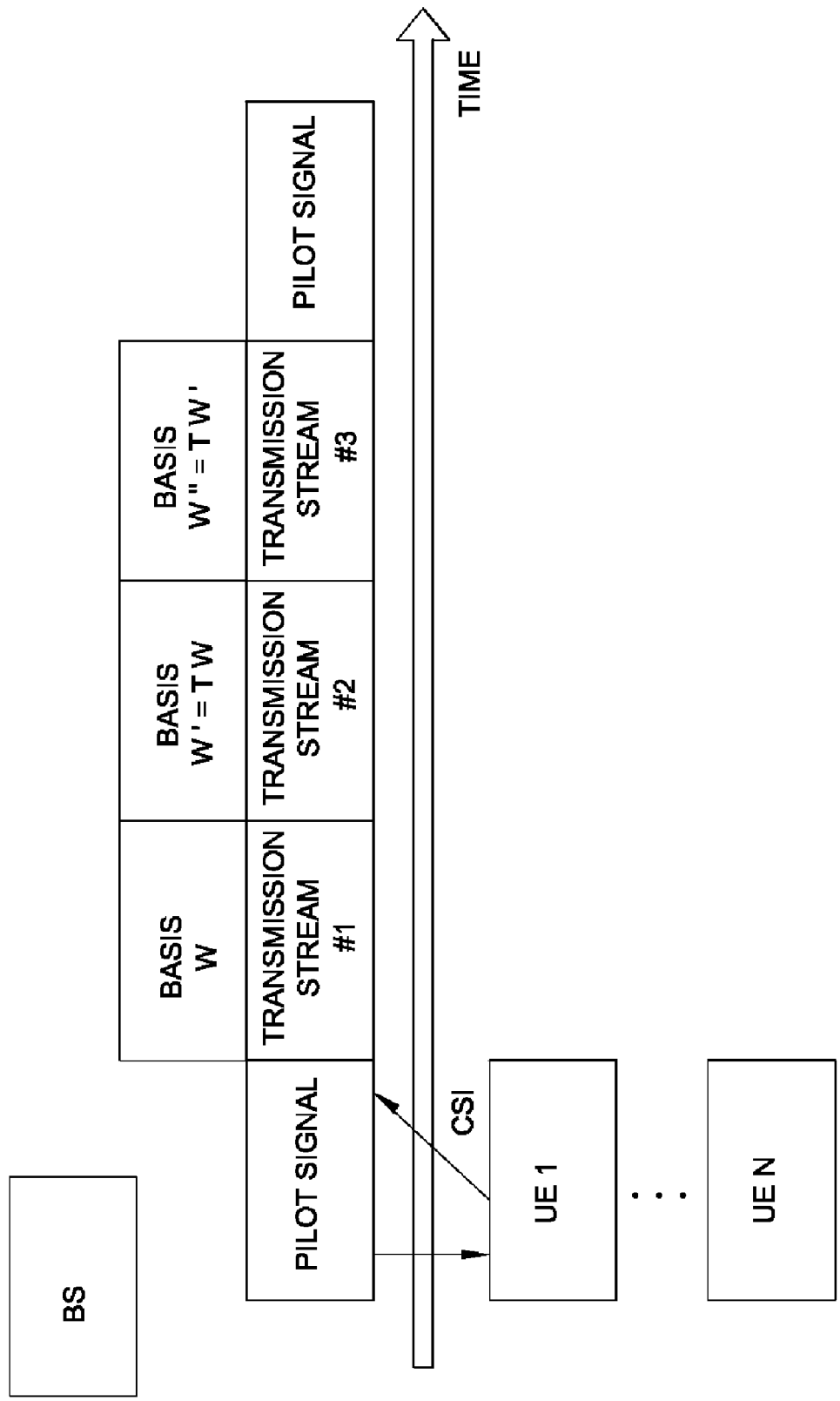

[Fig. 8]
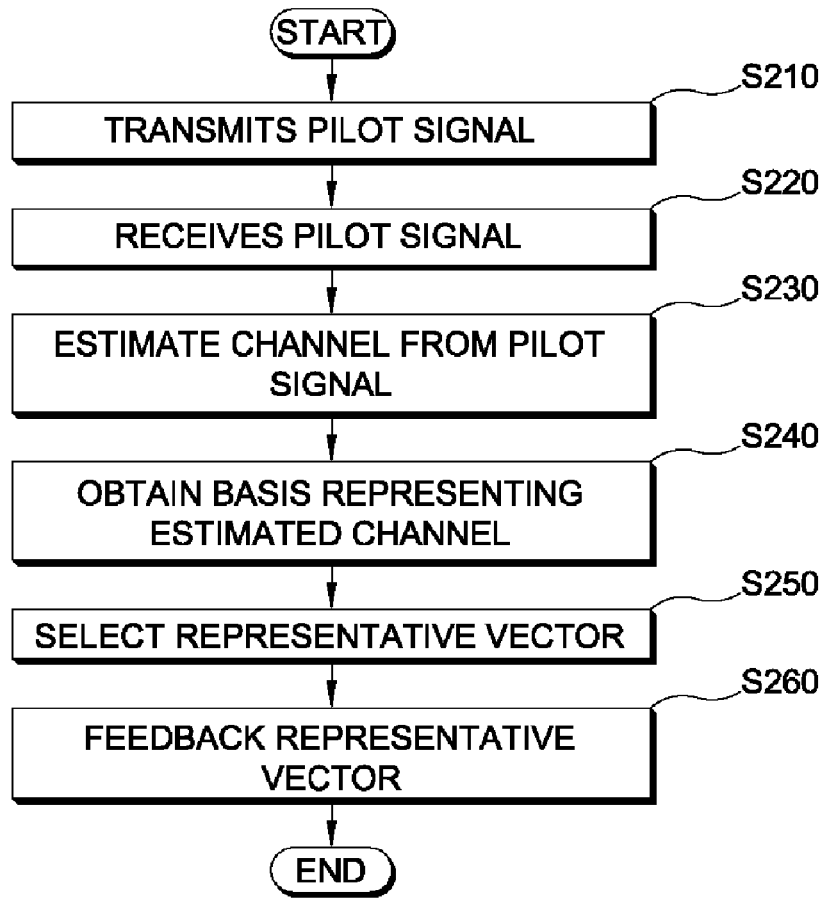
[Fig. 9]
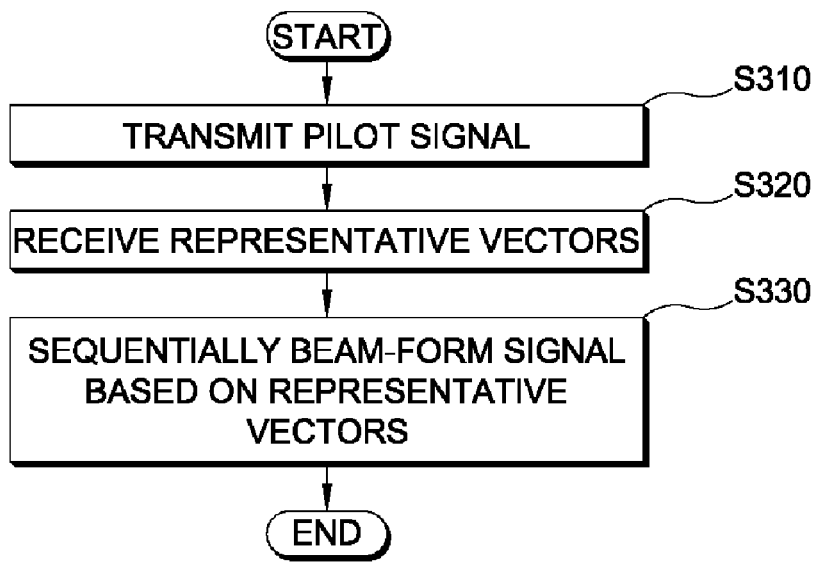

[Fig. 10]
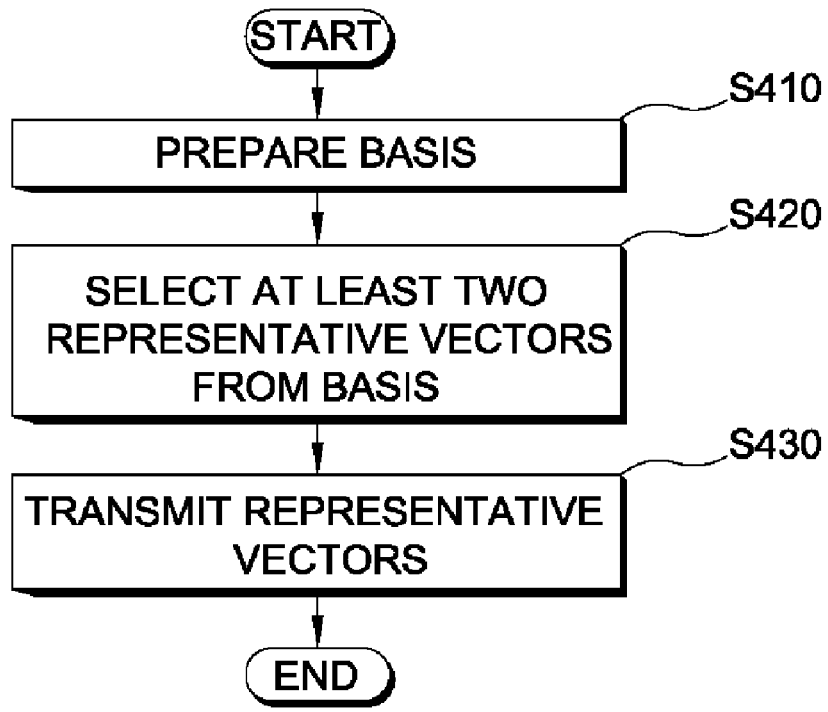
[Fig. 11]
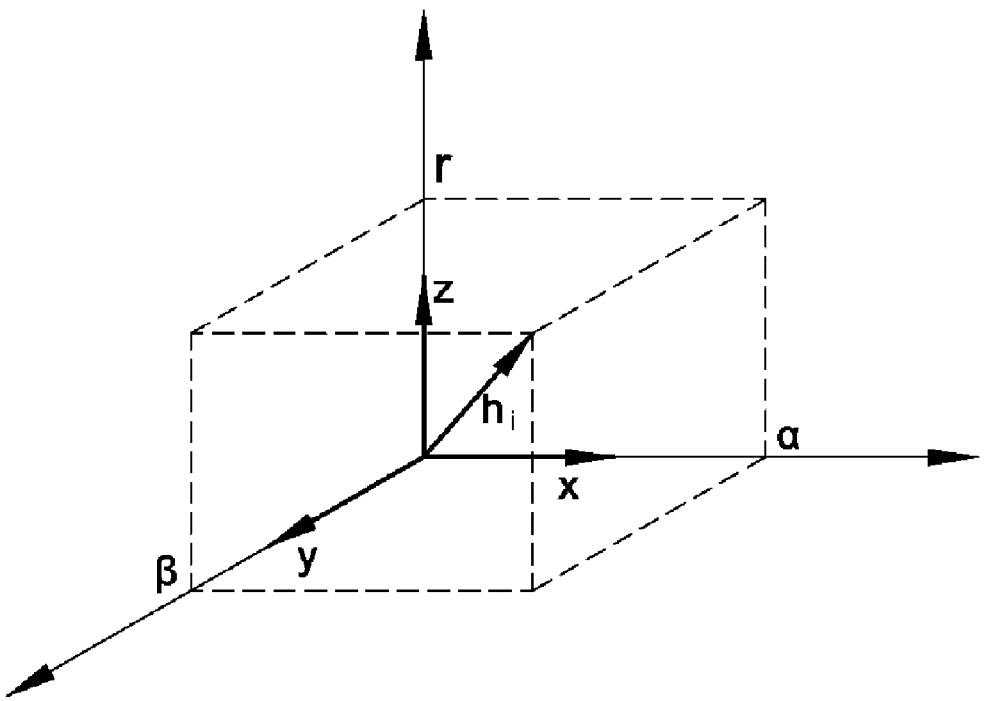

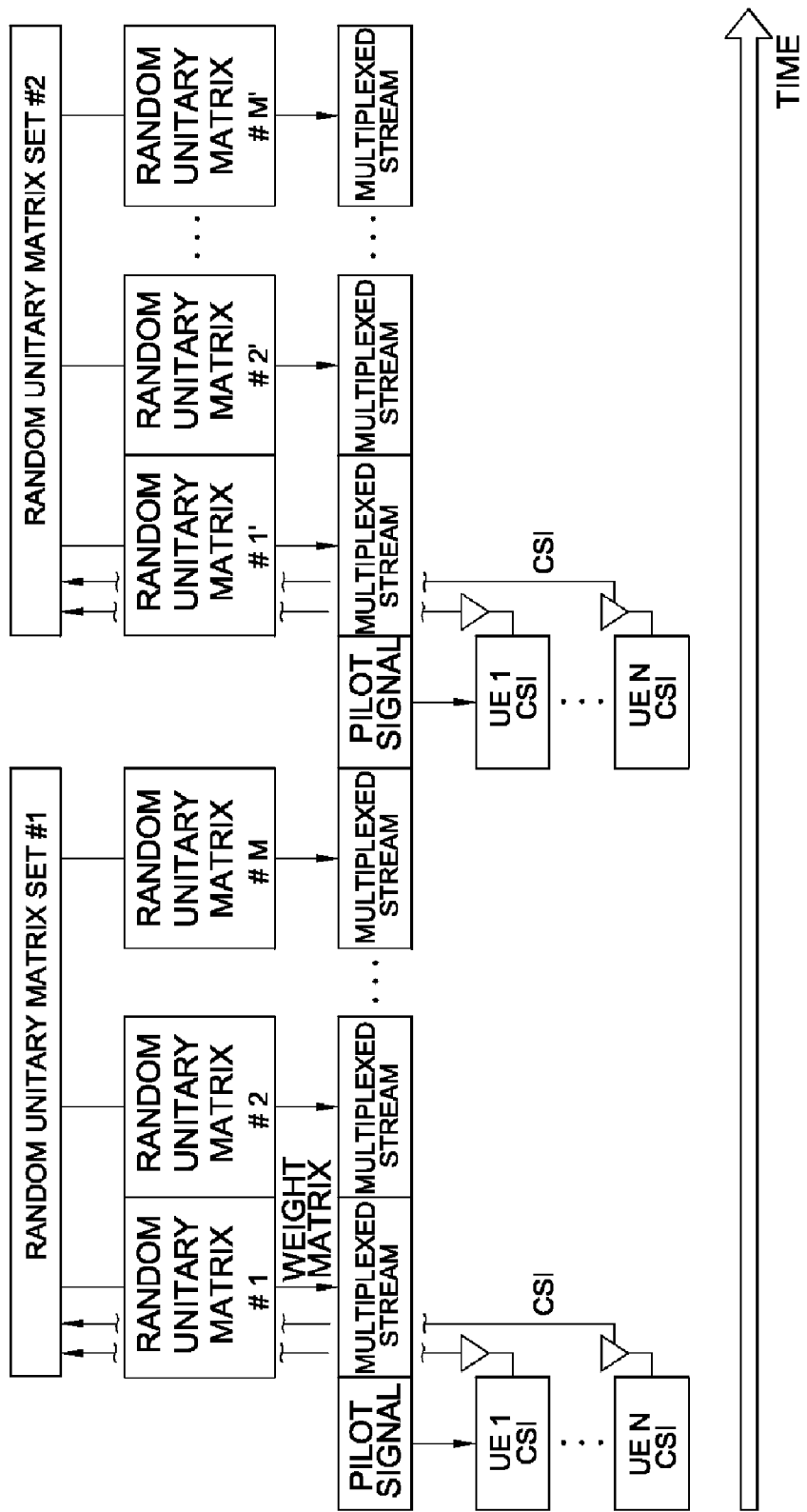
[Fig. 12]

[Fig. 13]
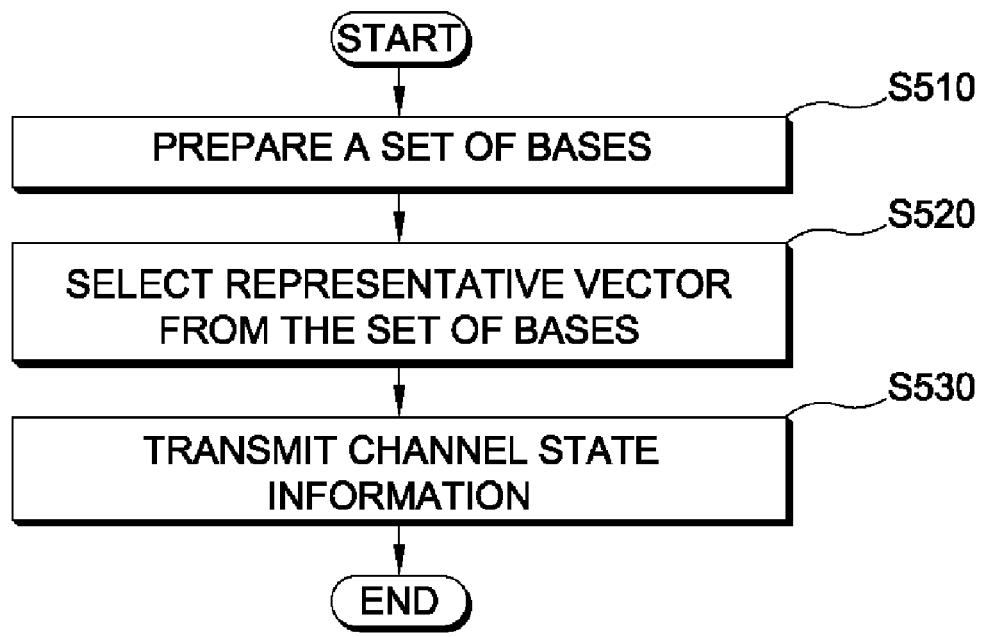
[Fig. 14]
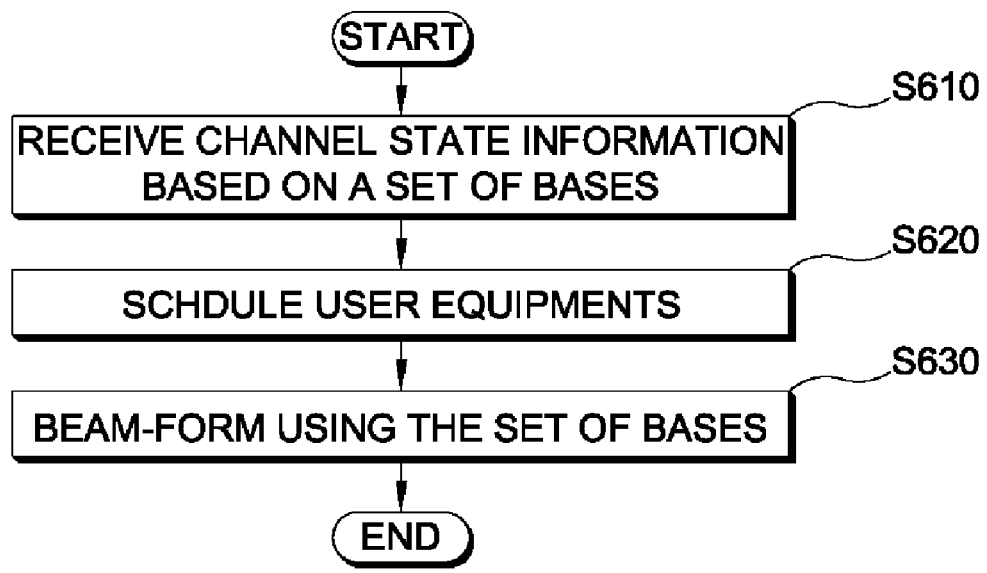

[Fig. 15]
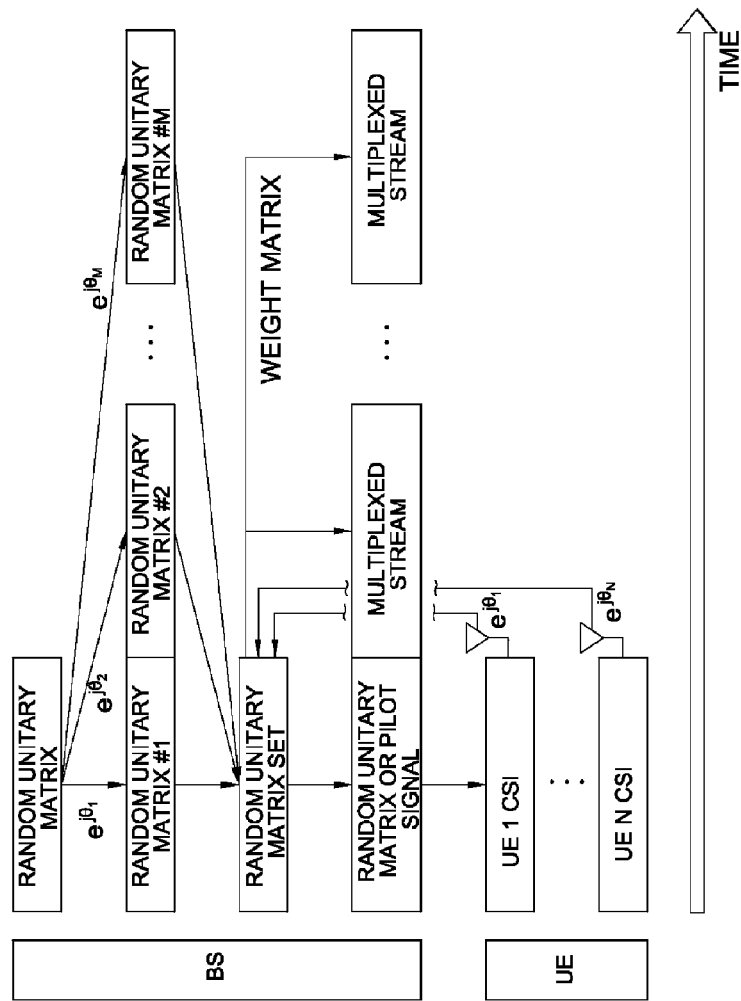
[Fig. 16]
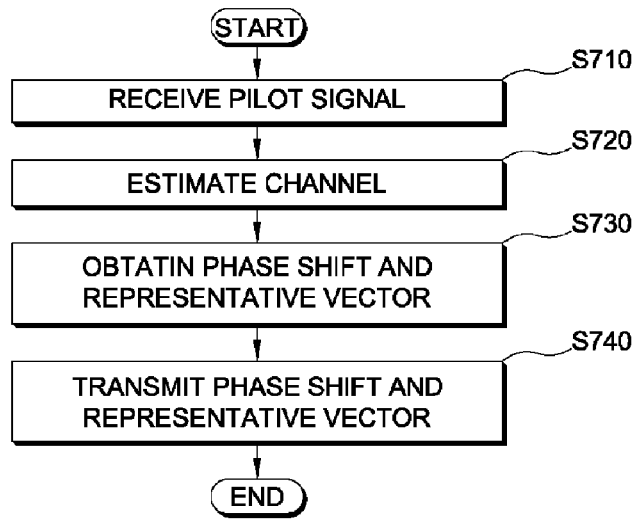

METHOD FOR TRANSMITTING CHANNEL STATE INFORMATION IN MULTIPLE ANTENNA SYSTEM

TECHNICAL FIELD

The present invention relates to a wireless communication, and more particularly, to a method for transmitting and generating channel status information in a multiple antenna system.

BACKGROUND ART

In order to maximize a system performance and a transmission capacity in the field of wireless communications, a multiple input multiple output (MIMO) system has attracted attentions. The MIMO system can enhance transmission efficiency by employing multiple transmitting antennas and multiple receiving antennas. When the number of antennas in the transmitter and receiver increases simultaneously, the theoretical channel transmission capacity increases in proportion to the number of antennas. It is possible to markedly enhance spectral efficiency.

The MIMO system has attracted attentions as a next-generation technology capable of overcoming a restriction on the data rate which has reached a limit due to an increase in data communication in the field of mobile communications. Since the next-generation mobile communications require a higher data rate than that of the existing mobile communications, efficient multiple antenna technology is needed. The MIMO technology is one of the next-generation mobile communication technologies which can be widely used.

The MIMO system collects fragmentary data pieces received by a plurality of antennas to complete data transmission. It is possible to enhance a data rate in a specific range or to enhance the system coverage at a specific data rate.

Various MIMO techniques have been actively studied from various viewpoints such as information theory associated with system capacity, measuring and modeling a wireless channel and a space-time signal processing for enhancing transmission reliability and data rate.

The MIMO techniques are roughly classified into a spatial diversity and a spatial multiplexing. The spatial diversity allows a multiple antenna to transmit the same data. The spatial diversity can enhance the transmission reliability by transmitting the same data through multi-path. The spatial diversity is divided into a space-time block coding (STBC) and a space-time trellis coding (STTC). The STBC has an advantage that complexity is low. The STTC has an advantage that the performance for enhancing a bit error rate (BER) and a degree of freedom for generating codes is high. By using the spatial diversity, it is possible to obtain a gain corresponding to a product of the number of transmitting antennas and the number of receiving antennas.

The spatial multiplexing allows the multiple antenna to transmit data different from each other. The receiver removes the interference by the use of a proper signal processing technique and then reproduces the data. Conventional interference removing techniques are a maximum likelihood method, a zero forcing (ZF) method, a minimum mean-square error (MMSE) method, a diagonal-bell laboratory layered space-time (D-BLAST) method, a vertical-BLAST (V-BLAST) method, etc. When channel information is known, singular value decomposition (SVD) may be used.

The spatial diversity gain can be saturated as diversity order increases. The spatial multiplexing can deteriorate the transmission reliability of wireless channels. The spatial diversity and the spatial multiplexing can be combined to acquire gains of both techniques.

A fading channel is widely known as a main reason to deteriorate performance of a wireless communication system. A channel in fading environment may vary depending on time, frequency, and space. To overcome the fading, a diversity technique uses the fact that the probability that all independent channels have low channel gains is very low.

A multi-user diversity is one of various diversity techniques. When a plurality of users exists in a cell, the channel gains of the plurality of users are independent of each other in probability. The probability that all the users have low channel gains is very low. The multi-user diversity can be classified into a time multi-user diversity, a frequency multi-user diversity, and a spatial multi-user diversity.

In the time multi-user diversity, the channel is assigned to the user having the highest channel gain when the channel varies with the lapse of time. According to the information theory, when transmission power is enough, the total capacity of the channels can be maximized by assigning all the channels to the user having the highest channel gain. In the frequency multi-user diversity, a sub-carrier is assigned to the user having the highest channel gain in a frequency multiplexing system. The spatial multi-user diversity uses the channel gains of the user varying depending on spaces. An example of the spatial multi-user diversity is a random beam-forming (RBF). The RBF is also called an opportunistic beam-forming. The RBF induces a variation of the channel by allowing a transmitter to perform a beam-forming process with a weighting value.

A closed loop structure is providing a feedback channel from a user equipment to a base station for enhancing the performance of the multiple antenna system. The close loops structure can be used in the spatial diversity or the spatial multiplexing. Information transmitted from the user equipment to the base station through the feedback channel is channel information. When the user equipment transmits the channel information to the base station, the base station can maximize the performance by controlling various system parameters such as power level and transmission format. An adaptive modulation and coding (AMC) technique enhances link performance by allowing the base station to control the modulation and coding scheme (MCS) based on the channel information. The AMC technique supports efficient transmission by increasing the data rate when the channel is good and decreasing the data rate when the channel is faded.

As the channel information becomes closer to the actual channel, it is more advantageous to enhance system performance, increase transmission efficiency and remove interference.

There is a need for a technique of representing channel information to be closer to the actual channel and transmitting the channel information more efficiently.

DISCLOSURE OF INVENTION

Technical Solution

Techniques are provided herein to represent a channel with high accuracy and enhance transmission efficiency.

According to an aspect of the invention, there is provided a method for transmitting channel state information in a wireless communication system. The method includes receiving a pilot signal, obtaining an estimated channel using the pilot signal, obtaining a plurality of bases representing the estimated channel, wherein a basis comprises a plurality of vectors and transmitting a representative vector as channel state information, wherein the representative vector is selected from the plurality of bases.

According to another aspect of the invention, there is provided a method for transmitting data in a multiple antenna system. The method includes preparing a plurality of weight matrixes for a plurality of antennas, receiving information for a plurality of representative vectors which is selected for each weight matrixes and represent channel information, beamforming a signal using the plurality of weight matrixes and transmitting the signal through the plurality of antennas.

According to still another aspect of the invention, there is provided a method for transmitting channel state information in a multiple antenna system. The method includes preparing a basis comprising a plurality of vectors, selecting at least two representative vectors from the basis so that the two representative vectors represent a channel and transmitting the two representative vectors as channel state information.

According to still another aspect of the invention, there is provided a method for generating channel state information in a multiple antenna system. The method includes preparing a set of bases comprising a plurality of bases, a basis comprising a plurality of vectors, the basis spanning vector space for a multiple antenna, selecting a representative vector from the set of bases to represent a channel and generating channel state information using the representative vector.

According to still another aspect of the invention, there is provided a method for transmitting data in a multiple antenna system. The method includes receiving channel state information comprising a representative vector selected from a set of weight matrixes, scheduling an user using the channel state information, generating a signal for the user sequentially using a weight matrix which comprise the representative vector and transmitting the signal for the user.

BRIEF DESCRIPTION OF THE DRAWINGS

FIG. 1 is a diagram illustrating a multiple antenna system.

FIG. 2 is a diagram illustrating channels from the $N_T$ transmitting antennas to an i-th receiving antenna.

FIG. 3 is a diagram illustrating a single-user multiple antenna system.

FIG. 4 is a diagram illustrating a multi-user multiple antenna system.

FIG. 5 is a block diagram illustrating a transmitter having multiple transmitting antennas according to an embodiment of the invention.

FIG. 6 is a block diagram illustrating a receiver according to an embodiment of the invention.

FIG. 7 is a diagram illustrating a method for transmitting channel state information.

FIG. 8 is a flowchart illustrating a method for transmitting CSI according to an embodiment of the invention.

FIG. 9 is a flowchart illustrating a method for transmitting data according to an embodiment of the invention.

FIG. 10 is a diagram illustrating a flow of operations in a channel status information feeding-back method according to another exemplary embodiment of the invention.

FIG. 11 is a diagram illustrating a basis and an estimated channel.

FIG. 12 is a diagram illustrating a method for transmitting CSI according to another aspect of the invention.

FIG. 13 is a flowchart illustrating operations of the embodiment of FIG. 12.

FIG. 14 is a flowchart illustrating a method for transmitting data according to another embodiment of the invention.

FIG. 15 is a diagram illustrating a method for transmitting CSI according to still another embodiment of the invention.

FIG. 16 is a flowchart illustrating a operation of the embodiment of FIG. 15.

MODE FOR THE INVENTION

Additional features and advantages of the invention will be set forth in the description which follows, and in part will be apparent from the description, or may be learned by practice of the invention. It is to be understood that both the foregoing general description and the following detailed description of the present invention are exemplary and explanatory and are intended to provide further explanation of the invention as claimed.

FIG. 1 is a diagram illustrating a multiple antenna system.

Referring to FIG. 1, a transmitter 100 includes $N_T$ transmitting antennas and a receiver 101 includes $N_R$ receiving antennas. Downlink transmission means transmission from a base station to an user equipment and uplink transmission means transmission from the user equipment to the base station. In downlink, the transmitter 100 may be a part of the base station and receiver 101 a part of the user equipment. In uplink, the transmitter 100 may be a part of the user equipment and receiver 101 a part of the base station.

The transmitter 100 transmits streams which are generated by processing information bits. The maximum number of streams transmitted through the $N_T$ transmitting antennas is $N_T$. The $N_T$ streams can be written as:

$$s=[s_1,s_2,\ldots,s_{N_T}]^T \qquad \text{Equation (1)}$$

where $s_i$ is a stream transmitted through a i-th transmitting antenna.

The streams $s_1, s_2, \ldots$, and $s_{N_T}$ can be transmitted with different transmission powers. When it is assumed that the transmission powers are $P_1, P_2, \ldots$, and $P_{N_T}$, the streams which the transmission powers are adjusted can be expressed in a vector as:

$$\hat{s}=[\hat{s}_1,\hat{s}_2,\ldots,\hat{s}_{N_T}]^T=[P_1s_1,P_2s_2,\ldots,P_{N_T}s_{N_T}]^T. \qquad \text{Equation (2)}$$

Using a diagonal matrix P of which diagonal elements are the transmission powers, the power-adjusted stream $\hat{s}$ can be expressed as:

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps. \qquad \text{Equation (3)}$$

Consider that a weight matrix W is applied to the power adjusted stream vector $\hat{s}$ so that N transmission signals $x_1, x_2, \ldots$, and $x_{N_T}$ are formed. The transmission signals $x_1, x_2, \ldots$, and $x_{N_T}$ can be expressed by a vector x as:

$$x = \begin{bmatrix} x_1 \\ x_2 \\ \vdots \\ x_i \\ \vdots \\ x_{N_T} \end{bmatrix} \quad \text{Equation (4)}$$

$$= \begin{bmatrix} w_{11} & w_{12} & \cdots & w_{1N_T} \\ w_{21} & w_{22} & \cdots & w_{2N_T} \\ \vdots & & \ddots & \\ w_{i1} & w_{i2} & \cdots & w_{iN_T} \\ \vdots & & \ddots & \\ w_{N_T 1} & w_{N_T 2} & \cdots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix}$$

$$= W\hat{s}$$

$$= WPs$$

where a weight $w_{ij}$ ($1 \leq i \leq N_T$, $1 \leq j \leq N_T$) is a weighting value of a j-th stream for an i-th transmitting antenna. The weight $w_{ij}$ can be arranged in the weight matrix W. The weight matrix W can also be called as a preceding matrix.

The transmission signal x can be transmitted by using a spatial diversity or by using a spatial multiplexing. When the spatial diversity is used, the same signal is transmitted through multiple antennas and elements of the power-adjusted stream $$\hat{s}$$

are all same. When the spatial multiplexing is used, the elements of the power-adjusted stream $$\hat{s}$$

may be different to each other. The spatial diversity and the spatial multiplexing can be combined. Three transmitting antennas can transmit streams by using the spatial diversity and the other transmitting antennas can transmit streams by using the spatial multiplexing.

Consider received signals of the receiver 101. Received signals $y_1, y_2, \ldots,$ and $y_{N_R}$ for the $N_R$ receiving antennas are written as:

$$y = [y_1 y_2 \ldots y_{N_R}]^T. \quad \text{Equation (5)}$$

Assume that the channels are expressed by the use of indexes of the transmitting and receiving antennas. A channel from the j-th transmitting antenna to the i-th receiving antenna is expressed as $h_{ij}$. The channel may also be called as MIMO channel. A set of the channel for multiple antennas can be expressed in the form of a vector and a matrix.

FIG. 2 is a diagram illustrating channels from the $N_T$ transmitting antennas to an i-th receiving antenna.

Referring to FIG. 2, channels from the transmitter 100 to a i-th receiving antenna can be expressed in the form of a vector as:

$$h_i^T = [h_{i1}, h_{i2}, \ldots, h_{iN_T}] \quad \text{Equation (6)}$$

where a superscript T denotes a transpose.

The channels from the $N_T$ transmitting antennas to the $N_R$ receiving antennas can be expressed in the form of a matrix by:

$$H = \begin{bmatrix} h_1^T \\ h_2^T \\ \vdots \\ h_i^T \\ \vdots \\ h_{N_R}^T \end{bmatrix} = \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & \ddots & \\ h_{N_R 1} & h_{N_R 2} & \cdots & h_{N_R N_T} \end{bmatrix}. \quad \text{Equation (7)}$$

In the actual wireless system, an additive white Gaussian noise (AWGN) is added to the channel matrix H. The AWGN for an i-th channel can be expressed as $n_i$ and AWGNs for all channels can be expressed in the form of a vector by:

$$n = [n_1 n_2 \ldots n_{N_R}]^T. \quad \text{Equation (8)}$$

The receiving signal y can be expressed by:

$$y = \begin{bmatrix} y_1 \\ y_2 \\ \vdots \\ y_i \\ \vdots \\ y_{N_R} \end{bmatrix} \quad \text{Equation (9)}$$

$$= \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & \ddots & \\ h_{N_R 1} & h_{N_R 2} & \cdots & h_{N_R N_T} \end{bmatrix} \begin{bmatrix} x_1 \\ x_2 \\ \vdots \\ x_j \\ \vdots \\ x_{N_T} \end{bmatrix} + \begin{bmatrix} n_1 \\ n_2 \\ \vdots \\ n_i \\ \vdots \\ n_{N_R} \end{bmatrix}$$

$$= Hx + n.$$

The receiver 101 can be an user equipment having multiple antennas or a plurality of user equipments having at least one antenna. For example, an user equipment may receive downlink signals through $N_R$ antennas. Or $N_R$ user equipments may concurrently receive downlink signals through one antenna. In any combination, the total number of receiving antennas can be kept $N_R$. This technique is generally called a MIMO BC (Broadcast Channel) or an SDMA (Space Division Multiple Access).

Reversely, an user equipment having $N_T$ antennas may transmit uplink signals. Or $N_T$ user equipments having one antenna may concurrently transmit uplink signals. In any combination, the total number of transmitting antennas can be kept $N_T$. This technique is generally called a MIMO MAC (Multiple Access Channel).

Since uplink transmission and downlink transmission show duality, the technique used in one side can be used in the other side. Although the MIMO BC be mainly shown in the following description, skilled in the art can easily be applied to the MIMO MAC.

FIG. 3 is a diagram illustrating a single-user multiple antenna system.

Referring to FIG. 3, a base station (BS) 310 as the transmitter has multiple antennas and an user equipment (UE) 320, that is, an user, as the receiver has multiple antennas. It is possible to obtain the maximum channel capacity by using MIMO technique.

Assume that the BS 310 and the UE 320 knows channel information perfectly. Using SVD (Singular Value Decomposition), a channel matrix H can be expressed as:

$$H = U\Sigma V^H \qquad \text{Equation (10)}$$

where U and V are a unitary matrix, $\Sigma$ is a diagonal matrix and a superscript H denotes a Hermitian matrix. In order to acquire the maximum gain in view of the channel capacity, V is selected as the weight matrix W. A receiving signal y is multiplied by $U^H$ as shown in:

$$y = Hx + n = U\Sigma V^H x + n = U\Sigma V^H W\hat{s} + n = U\Sigma V^H V\hat{s} + n = U\Sigma \hat{s} + n,$$

$$\tilde{y} = U^H y = U^H U\Sigma \hat{s} + U^H n = \Sigma \hat{s} + \tilde{n} = \Sigma Ps + \tilde{n}. \qquad \text{Equation (11)}$$

A transmission power matrix P in Equation (11) can be determined by a water filling technique so as to acquire the maximum channel capacity.

FIG. 4 is a diagram illustrating a multi-user multiple antenna system.

Referring to FIG. 4, a BS 410 has $N_T$ antennas and the respective UEs 420-1, 420-2, . . . , and 420-$N_R$ have one antenna. Similarly to the single user environment shown in FIG. 3, channel capacity can be maximized by the use of a transmission beam-forming process.

However, interference between the UEs should be considered. When the transmission beam-forming process is used, the weighting vector should be selected so as to minimize the interference between the UEs. The multi-user environment needs a system more complicated than the single user environment.

In the multi-user multiple antenna system, a dirty paper coding (DPC) is well known as the optimal scheme in view of the channel capacity. The complexity thereof is considerable and thus it is not easy to implement the DPC. A zero forcing beam-forming (ZFBF), a random beam-forming (RBF) and the like are known as the next optimal schemes. In such schemes, as the number of UEs increases, optimal performance can be achieved.

In ZFBF, a receiver uses an inverse channel matrix $H^{-1}$ to decompose a receiving signal. The receiving signal y can be expressed by Equation (12).

$$W = H^{-1}$$

$$y = Hx + n = HW\hat{s} + n = HH^{-1}\hat{s} + n = \hat{s} + n = Ps + n \qquad \text{Equation (12)}$$

A channel matrix H should be a non-singular so that the inverse channel matrix $H^{-1}$ always exists. We can make up the channel matrix H as a unitary matrix since the unitary matrix is the non-singular matrix.

In order to be the unitary matrix, different row (or column) vectors of the channel matrix H should be orthogonal to each other. Two vectors are orthogonal if inner product between the two vectors is zero.

Let a column vector $h_i$ be elements of the i-th column of H as shown in:

$$h_i^T = [h_{i1}, h_{i2}, \ldots, h_{iN_T}]. \qquad \text{Equation (13)}$$

When the channel matrix H is the unitary matrix, inner product between two different column vectors $h_i$ and $h_j$ of H is zero. This relation can be written as:

$$\begin{cases} h_i^H h_j = 0 \\ h_i^H h_i \neq 0 \end{cases} \qquad \text{Equation (14)}$$

when $i \neq j$

So we can call the channel matrix H the unitary matrix if the column vectors of the channel matrix H satisfy Equation 14. The unitary matrix H has another property as:

$$H^{-1} = H^H. \qquad \text{Equation (15)}$$

The ZFBF has an advantage that it need not particular operation of the receiver to detect the receiving signal and the matrix calculation is little complex. However, since the channel matrix H should be the unitary matrix, the receiving antennas, that is, the UEs, should be selected so that all the MIMO channels are orthogonal. The i-th receiving antenna should be selected so that the channel $h_i$ of the i-th receiving antenna is orthogonal to channels of the other receiving antennas. To select channels, all the channel information should be known.

A receiver generally measures a estimated channel based on a pilot signal (reference signal) transmitted from a transmitter. The transmitter should be aware of the estimated channel by receiving channel information from the receiver. When the transmitter knows all channels, the transmitter can adaptively perform a transmission. The ZFBF is one example. Since the channels vary with the lapse of time, the channel information should be transmitted from the receiver to the transmitter as often as possible to improve accuracy. But it may exhaust radio resources and limit data rates. Also, it is not easy to transmit the channel information accurately since a quantization error may exist.

The RBF is a beam-forming process without any channel information. The RBF is performed as follows. (1) A transmitter transmits a pilot signal through multiple antennas by the use of a weighting vector created randomly. (2) A receiver receiving the pilot signal estimates a signal-to-noise ratio (SNR) and transforms the SNR into a proper data rate or a signal-to-interference noise ratio (SINR). (3) The receiver feeds back the SINR to the transmitter. The receivers need not be aware whether the transmitter has multiple antennas. (4) The transmitter assigns the channel to the receiver having the highest SINR. (5) After a predetermined time passes, the transmitter transmits the pilot signal by the use of the weighting vector created randomly and repeats the step (2) again.

As the number of receivers (UEs) in a cell increases, the probability that the weighting vector created randomly is very close to the actual channel increases. Accordingly, the RBF can achieve the performance closer to the ZFBF as the number of receivers increases.

Let weight vectors $w_1, w_2, \ldots,$ and $w_{N_T}$ be column vectors of a unitary weight matrix W created randomly by the transmitter. The product of a transmission power matrix P and a transmission stream vector s is expressed as Ps. Without losing generality, we can choose the transmission power matrix P as an identity matrix I. A transmission signal x can be expressed by:

$$x = [w_1 w_2 \ldots w_{N_T}]Ps = WPs = Ws. \qquad \text{Equation (16)}$$

A receiving signal $y_i$ received by the i-th receiving antenna can be expressed by:

$$y_i = [h_{i1}, h_{i2}, \ldots h_{iN_T}]x + n_i \qquad \text{Equation (17)}$$

$$= h_i^H x + n_i$$

-continued $$= h_i^H W s + n_i$$

$$= h_i^H [w_1 w_2 \ldots w_{N_T}] s + n_i$$

$$= [h_i^H w_1 \, h_i^H w_2 \, h_i^H w_{N_T}] s + n_i$$

$$= \sum_{k=1}^{N_T} h_i^H w_k s_k + n_i$$

In the RBF, the i-th receiving antenna's SINR for a weight vector $w_m$ can be defined by:

$$SINR_{i,m} = \frac{|h_i^H w_m s_m|^2}{1 + \sum_{k=1, k \neq m}^{N_T} |h_i^H w_k s_k|^2} \quad \text{Equation (18)}$$

The weight vector $w_m$ in which the $SINR_{i,m}$ of Equation (18) is the maximum can be found out. We call it a maximum weight vector $w_{max}$.

Assume that an a $N_T$ dimension complex vector space $C^{N_T}$ is spanned by weight vectors $w_1, w_2 \ldots$, and $w_{N_T}$. The vector space
$C^{N_T}$ is a column space of the weight matrix W. When a channel of the i-th receiving antenna hi belongs to a null space of $C^{N_T}$, the inner product of $h_i$ and any one of weight vectors is zero as shown in:

$$h_i^H w_i = \ldots = h_i^H w_{N_T} = 0. \quad \text{Equation (19)}$$

Since the weight matrix W is assumed as a unitary matrix, the null space of
$C^{N_T}$ is a zero space. But the channel $h_i$ does not belong to the zero space. The product cannot be zero as shown in:

$$h_i^H w_k \neq 0 \; (k=1,2,\ldots,N_T). \quad \text{Equation (20)}$$

Accordingly, the minimum value of the SINR of Equation (18) is always larger than zero.

To maximize the SINR of Equation (18), the channel $h_i$ should belong to one of subspaces $L(w_1), L(w_2), \ldots,$ and $L(w_{NT})$ of the vector spaces. Geographically, subspaces $L(w_1), L(w_2), \ldots,$ and $L(w_{NT})$ denote lines in the $N_T$ dimension complex vector space
$C^{N_T}$ using weight vectors $w_1, w_2 \ldots,$ and $w_{NT}$ as a basis of the vector space
$C^{N_T}$.

The basis of a vector space
$C^{N_T}$ is a linearly independent subset of
$C^{N_T}$ that spans (or generates)
$C^{N_T}$.

When the weight matrix W is the basis, the basis comprises column (row) vectors of the weight matrix W.

When the channel $h_i$ belongs to a subspace $L(w_m)$, it gives:

$$h_i \in L(w_m) \Leftrightarrow \begin{cases} h_i^H w_m \neq 0 \\ h_i^H w_j = 0 \end{cases} \quad \text{Equation (21)}$$

$(j \neq m)$

Accordingly, if we find out the weight vector $w_m$ which belongs to the subspace $L(w_m)$, we maximize the SINR ($w_m = w_{max}$). The maximum weight vector $w_{max}$ is a vector which has a maximum coefficient when the vector is projected onto the basis of the vector space
$C^{N_T}$.

The SINR of Equation (18) indicates how closely the corresponding channel is orthogonal to one of weight vectors $w_1, w_2, \ldots$ and $w_{NT}$.

In the beam-forming, not are streams for all users transmitted but streams for users corresponding to the maximum number of transmitting antennas (or receiving antenna) can be transmitted. One of user selection criterion is that channels between the selected users are orthogonal to each other.

In the ZFBF, user selection process can be as follows. (1) All users transmit channel information to the transmitter. (2) The transmitter selects users of which channels are orthogonal to each other using the channel information. (3) A channel matrix for selected users is made up and an inverse matrix of the channel matrix is selected as a weight matrix. (4) Signals for selected users are beam-formed using the weight matrix and transmitted.

In the RBF, (1) a transmitter selects a unitary weight matrix and transmits to users using the selected unitary weight matrix. (2) Every user selects a column vector having the maximum value from the weight matrix based on the received signal. A SINR is calculated according to the selected column vector. The index of the selected column vector and the SINR are transmitted to the transmitter. (3) The transmitter selects users having the channels closest to the column vectors of the weight matrix based on the index and SNIR. Since the weight matrix is an unitary matrix, channels of the selected users are orthogonal to each other. (4) Signals for selected users are beam-formed using the weight matrix and transmitted.

In the ZFBF, each user transmits its channel information without performing any process. On the contrary, in the RBF, each user calculates the degree of orthogonality using a column vector of a weight matrix and then transmits the maximum SINR and an index of the column vector corresponding to the maximum SNIR.

As shown above, as an channel becomes closer to one of the subspaces which are constituted by the basis, the channel has a larger SINR value in the RBF. An user to be transmitted is determined depending on how closely the user's channel is related to the column space of the weight matrix. The dimension of the column spaces of the weight matrix, that is, the number of vectors constituting the basis, is equal to the number of antennas $N_T$. The probability that the user has the maximum SINR is equal to the probability that the user's channel is matched with one of the subspaces. The probability is very low since the user's channel is time-varying and unpredictable. As a result, many users are required to increase the probability.

Mathematically, a vector in an $N_T$ dimension vector space can be expressed by a basis including $N_T$ vectors. A standard basis is expressed as a set of column vectors of an identity matrix. Using the standard basis, a channel h can be expressed by:

$$h = \begin{bmatrix} h_1 \\ h_2 \\ \vdots \\ h_i \\ \vdots \\ h_{N_T} \end{bmatrix}$$

$$= h_1 \begin{bmatrix} 1 \\ 0 \\ \vdots \\ 0 \\ \vdots \\ 0 \end{bmatrix} + h_2 \begin{bmatrix} 0 \\ 1 \\ \vdots \\ 0 \\ \vdots \\ 0 \end{bmatrix} + \ldots + h_i \begin{bmatrix} 0 \\ 0 \\ \vdots \\ 1 \\ \vdots \\ 0 \end{bmatrix} + \ldots + h_{N_T} \begin{bmatrix} 0 \\ 0 \\ \vdots \\ 0 \\ \vdots \\ 1 \end{bmatrix}$$

Equation (22)

Using the standard basis, we need the total $N_T$ coefficients of $h_1, h_2, \ldots,$ and $h_{N_T}$ to represent the channel h. The channel h can be reproduced by combining $h_1, h_2, \ldots,$ and $h_{N_T}$ and the standard basis.

If the channel $h=[h_1, h_2, \ldots,$ and $h_{N_T}]^T$ has a specific value, the number of coefficients required to transmit the channel vector h can be reduced by changing the basis. For example, consider a channel vector $h=[-3, 3, -3, 3]^T$. Under the standard basis, 4 coefficients of $-3, 3, -3$ and 3 should be needed to represent the channel as shown in:

$$h = \begin{bmatrix} -3 \\ 3 \\ -3 \\ 3 \end{bmatrix} = -3\begin{bmatrix} 1 \\ 0 \\ 0 \\ 0 \end{bmatrix} + 3\begin{bmatrix} 0 \\ 1 \\ 0 \\ 0 \end{bmatrix} + (-3)\begin{bmatrix} 0 \\ 0 \\ 1 \\ 0 \end{bmatrix} + 3\begin{bmatrix} 0 \\ 0 \\ 0 \\ 1 \end{bmatrix}$$

Equation (23)

Consider that we choose $[1, 1, 1, 1]^T$, $[1, -1, 1, -1]^T$, $[1, 1, -1, -1]^T$ and $[1, -1, -1, 1]^T$ as a basis, only one coefficient of $-3$ is needed to represent the channel as shown in:

$$h = \begin{bmatrix} -3 \\ 3 \\ -3 \\ 3 \end{bmatrix} = 0\begin{bmatrix} 1 \\ 1 \\ 1 \\ 1 \end{bmatrix} + (-3)\begin{bmatrix} 1 \\ -1 \\ 1 \\ -1 \end{bmatrix} + 0\begin{bmatrix} 1 \\ 1 \\ -1 \\ -1 \end{bmatrix} + 0\begin{bmatrix} 1 \\ -1 \\ -1 \\ 1 \end{bmatrix}$$

Equation (24)

The coefficient of $-3$ is enough to represent the channel vector h. The amount of transmission information can greatly be reduced by changing a basis.

Column vectors of an unitary matrix can be used as a basis. In the RBF, column vectors of a weight matrix become a basis. A column vector which has the largest coefficient among the column vectors is selected. There are several problems in applying the RBF to an actual wireless communication environment.

The first problem is that the RBF is not efficient in view of channel capacity. Channel information can be fed back only when a random unitary matrix is continuously transmitted. Continuous transmission of the random unitary matrix causes a waste of that the channel capacity. A transmission signal generally includes a pilot signal for various reasons for data demodulation, synchronization, and the like. Since the receiver can measure a estimated channel using the pilot signal, transmission of the random unitary matrix only for acquiring the channel information causes waste of the channel capacity.

The second problem is that the RBF can be effectively operated when the number of users in a cell is large enough. A randomly generated weight matrix may not be suitable for representing every user's actual channel. When all column vectors of the randomly generated weight matrix are used to represent a channel, the channel may be accurate. But only one column vector is used in the RBF. If one column vector cannot effectively represent an user's actual channel, the channel information transmitted from the user may be mismatched with the user's actual channel. In order to select an user exhibiting a high SINR, many user are necessary in probability.

The third problem is that the channel capacity is wasted by transmitting unwanted channel information. All users should transmit a SINR and an index. If a channel is not matched with the basis, the channel exhibits a low SINR. An user having the low SINR is hardly selected, but the user transmits the low SINR nevertheless. The channel capacity is wasted by transmitting unused channel information.

The fourth problem is that the users' interference cannot effectively be mitigated in the RBF. An user's channel not matched with a basis gives a low SINR. Although the user's channel does not match with the basis, the user may necessarily receive or transmit a signal. Examples thereof include a case where re-transmission is required in response to Hybrid Automatic Repeat Request (HARQ) scheme and a case where an user's buffer is full and thus uplink transmission is necessarily required. The RBF does not effectively mitigate the interference with users since the user having the low SINR cannot use the channel. This is a loss in view of the channel capacity.

The above-mentioned problems of the RBF can be summarized as follows. The first problem is due to the basis change. The second to fourth problems are due to the mismatch between the basis and the user's actual channel.

Now, the multi-user MIMO system is considered in which the number of transmitting antennas of a transmitter is $N_T$ (where $N_T$ is a natural number larger than 2), the number of receivers is k (where k is a natural number larger than 1) and each receiver receives a signal through one receiving antenna.

FIG. 5 is a block diagram illustrating a transmitter having a multiple transmitting antenna according to an embodiment of the invention.

Referring to FIG. 5, the transmitter 500 includes a data processor 510, a power allocator 520, a precoder 530, an RF (Radio Frequency) unit 540 and a controller 550.

The data processor 510 processes and modulates information bits in accordance with predetermined modulation and coding scheme (MCS) so as to create a transmission stream. When the AMC scheme is used, the data processor 510 can select one of pre-determined MCS sets in accordance with an AMC control signal sent from the controller 550. The transmission stream is denoted by s. The data processor 550 may include a channel encoder (not shown) and a mapper (not shown). The channel encoder encodes information bits in accordance with a predetermined coding scheme so as to form a encoded data. The mapper maps the encoded data on a signal constellation. The modulation scheme of the mapper is not particularly limited and may be an m-PSK (m-Phase Shift Keying) or an m-QAM (m-Quadrature Amplitude Modulation). For example, the m-PSK method may be a BPSK (Binary-PSK), a QPSK (Quadrature-PSK) or an 8-PSK. The m-QAM may be a 16-QAM, a 64-QAM or a 256-QAM.

The power allocator 520 allocates proper powers to the transmission stream. The power-adjusted transmission stream is denoted by $\hat{s}$.

The precoder 530 generates a transmission signal vector x by applying the adjusted transmission
$$\hat{s}$$
to a weight matrix W. The transmission signal x is transmitted through the RF unit 540.

The controller 550 receives channel state information (CSI) and controls the precoder 530, the data processor 510 and the power allocator 520. The CSI can be any form which shows channel information. The CSI can be feedback information indicating a status of a downlink channel or an uplink channel. The controller 550 provides the precoder 530 with information of the weight matrix W. The controller 550 supplies a control signal to the data processor 510 and the power allocator 520. The control signal may be a MCS index or a power offset value which is transmitted as the CSI.

FIG. 6 is a block diagram illustrating a receiver according to an embodiment of the invention.

Referring to FIG. 6, the receiver 600 includes a data processor 610, a channel estimator 620, an equalizer 630, an RF unit 640 and a controller 650.

The RF unit 640 receives a signal through a receiving antenna and outputs a receiving signal. The receiving signal is expressed as y. The channel estimator 620 estimates a channel. The channel estimator 620 may estimate the channel using a pilot signal included in the receiving signal. An estimated channel is expressed as
$$\hat{h}.$$

The equalizer 630 equalizes the receiving signal using the estimated channel. The data processor 610 corresponds to the data processor 510 of the transmitter 500. The data processor 610 demaps and decodes an input signal the signal to reproduce the information bits.

The controller 650 receives the estimated channel from the channel estimator 620 and generates the CSI as feedback information. The controller 650 transmits feedback information to the transmitter 500.

FIG. 7 is a diagram illustrating a method for transmitting channel state information.

Referring to FIG. 7, a base station (BS) transmits a pilot signal and receives a CSI from a plurality of user equipments (UEs). The BS applies a weight matrix to a transmission stream to generate a transmission signal while changing the weight matrix. After a predetermined time elapses, the BS transmits the pilot signal again.

The BS uses weight matrixes W, W' and W" which are changed depending on the transmission stream. The weight matrixes W, W' and W" are unitary matrixes of $N_T \times N_T$ where $N_T$ is the number of transmitting antenna at the BS. The column vectors of a unitary matrix are orthogonal to each other. The column vectors of the weight matrix are linearly independent to each other. The column vectors of the weight matrix can be considered as a basis of a $N_T$ dimensional space. W' and W" can be obtained by transforming the weight matrix W in accordance with a predetermined rule. For example, W' and W" can be obtained by linearly transforming the weight matrix W.

The BS can pseudo-randomly transform the weight matrix. The weight matrix and the transforming pattern of the weight matrix are known by both UEs and the BS.

Although three weight matrixes have been described, the inventive concept is not limited to it. Two or more transformations of the weight matrix can be performed and three or more weight matrix can be used.

FIG. 8 is a flowchart illustrating a method for transmitting CSI according to an embodiment of the invention.

Referring to FIG. 8, a BS transmits a pilot signal (S210). The pilot signal is a signal known in advance by both the BS and a UE.

The UE receives the pilot signal through a receiving antenna (S220). The received pilot signal can be expressed by $y_i$ where the subscript i means the i-th UE. A channel from a j-th transmitting antenna to an i-th UE is expressed by $h_{ij}$. A channel from the $N_T$ transmitting antennas to the i-th UE is expressed in the form of a vector by:

$$h_i^T = [h_{i1}, h_{i2}, \ldots, h_{iN_T}]. \qquad \text{Equation (25)}$$

The receiving signal $y_i$ received by the i-th UE can be expressed as:

$$y_i = h_i^H r + n_i \qquad \text{Equation (26)}$$

where $n_i$ denotes Additive White Gaussian Noise (AWGN) received by the i-th UE and r denotes the pilot signal.

The UE estimates the channel using the pilot signal and acquires an estimated channel (S230). Since the UE knows the pilot signal r, the channel can be easily obtained, which is called an estimated channel
$$\hat{h}_i$$
of a i-th user equipment as shown in:

$$\hat{h}_i^T = [\hat{h}_{i1}, \hat{h}_{i2}, \ldots, \hat{h}_{iN_T}]. \qquad \text{Equation (27)}$$

The UE obtains a basis representing the estimated channel (S240). The basis may be one of weight matrixes W, W' and W". The weight matrixes W, W' and W" are the same as described with reference to FIG. 7. The estimated channel
$$\hat{h}_i$$
is a vector having $N_T$ components and belongs to a $N_T$ dimensional space. The weight matrixes W, W' and W" are unitary matrixes and serve as the basis. The estimated channel
$$\hat{h}_i$$
can be expressed as linear combination of the column vectors of any one of weight matrixes W, W' and W".

The process for acquiring a basis of the estimated channel will be described in detail. For clarity, it is assumed that the number of transmitting antennas $N_T$ is 4.

The weight matrix W can be expressed as:

$$W = [w_1 w_2 w_3 w_4] = \begin{bmatrix} w_{11} & w_{12} & w_{13} & w_{14} \\ w_{21} & w_{22} & w_{23} & w_{24} \\ w_{31} & w_{32} & w_{33} & w_{34} \\ w_{41} & w_{42} & w_{43} & w_{44} \end{bmatrix}. \qquad \text{Equation (28)}$$

The weight matrix W' can be expressed as:

$$W' = TW = [w'_1 w'_2 w'_3 w'_4] = \begin{bmatrix} w'_{11} & w'_{12} & w'_{13} & w'_{14} \\ w'_{21} & w'_{22} & w'_{23} & w'_{24} \\ w'_{31} & w'_{32} & w'_{33} & w'_{34} \\ w'_{41} & w'_{42} & w'_{43} & w'_{44} \end{bmatrix} \qquad \text{Equation (29)}$$

where a matrix T is a matrix performing a linear transformation.

The weight matrix W" can be expressed as:

$$W'' = TW' = [w_1'' w_2'' w_3'' w_4''] = \begin{bmatrix} w_{11}'' & w_{12}'' & w_{13}'' & w_{14}'' \\ w_{21}'' & w_{22}'' & w_{23}'' & w_{24}'' \\ w_{31}'' & w_{32}'' & w_{33}'' & w_{34}'' \\ w_{41}'' & w_{42}'' & w_{43}'' & w_{44}'' \end{bmatrix}. \quad \text{Equation (30)}$$

Using a standard basis, the estimated channel $\hat{h}_i$ can be expressed by:

$$\hat{h}_i = \begin{bmatrix} \hat{h}_{i1} \\ \hat{h}_{i2} \\ \hat{h}_{i3} \\ \hat{h}_{i4} \end{bmatrix} = \hat{h}_{i1} \begin{bmatrix} 1 \\ 0 \\ 0 \\ 0 \end{bmatrix} + \hat{h}_{i2} \begin{bmatrix} 0 \\ 1 \\ 0 \\ 0 \end{bmatrix} + \hat{h}_{i3} \begin{bmatrix} 0 \\ 0 \\ 1 \\ 0 \end{bmatrix} + \hat{h}_{i4} \begin{bmatrix} 0 \\ 0 \\ 0 \\ 1 \end{bmatrix}. \quad \text{Equation (31)}$$

The standard basis means a basis which comprises a set of column vectors of an identity matrix.

The basis of the estimated channel $\hat{h}_i$ expressed by Equation (31) can be changed by using the column vectors of the weight matrix W as a basis, thereby obtaining $$\hat{h}_i = \begin{bmatrix} \hat{h}_{i1} \\ \hat{h}_{i2} \\ \hat{h}_{i3} \\ \hat{h}_{i4} \end{bmatrix} \quad \text{Equation (32)}$$

$$= aw_1 + bw_2 + cw_3 + dw_4$$

$$= a \begin{bmatrix} w_{11} \\ w_{21} \\ w_{31} \\ w_{41} \end{bmatrix} + b \begin{bmatrix} w_{12} \\ w_{22} \\ w_{32} \\ w_{42} \end{bmatrix} + c \begin{bmatrix} w_{13} \\ w_{23} \\ w_{33} \\ w_{43} \end{bmatrix} + d \begin{bmatrix} w_{14} \\ w_{24} \\ w_{34} \\ w_{44} \end{bmatrix}.$$

Acquiring a basis of an estimated channel means that the standard basis of the estimated channel is changed to a basis which comprises the column vectors of the weight matrix.

The UE selects a representative vector (S250). The representative vector is a column vector having the largest coefficient. For example, the coefficient of the column vector for the weight matrix W is value of a, b, c and d in Equation (32) respectively. Each value of a, b, c and d represents the coefficient in the direction of the column vectors $w_1$, $w_2$, $w_3$ and $w_4$ respectively. Each value of a, b, c and d means a value obtained by projecting the estimated channel $\hat{h}_i$ onto each column vectors $w_1$, $w_2$, $w_3$ and $w_4$. The column vector having the largest coefficient (having the largest value of a, b, c, and d) most similarly represents the estimated channel and becomes the representative vector. The UE acquires an index of the representative vector.

Representative vectors can also be obtained for each weight matrixes W' and W". The estimated channel $\hat{h}_i$ using column vectors of the weight matrix W' of Equation (29) can be written as:

$$\hat{h}_i = \begin{bmatrix} \hat{h}_{i1} \\ \hat{h}_{i2} \\ \hat{h}_{i3} \\ \hat{h}_{i4} \end{bmatrix} \quad \text{Equation (33)}$$

$$= a'w_1' + b'w_2' + c'w_3' + d'w_4'$$

$$= a' \begin{bmatrix} w_{11}' \\ w_{21}' \\ w_{31}' \\ w_{41}' \end{bmatrix} + b' \begin{bmatrix} w_{12}' \\ w_{22}' \\ w_{32}' \\ w_{42}' \end{bmatrix} + c' \begin{bmatrix} w_{13}' \\ w_{23}' \\ w_{33}' \\ w_{43}' \end{bmatrix} + d' \begin{bmatrix} w_{14}' \\ w_{24}' \\ w_{34}' \\ w_{44}' \end{bmatrix}.$$

The UE acquires the values of a', b', c' and d' and an index of the column vector having the largest coefficient.

The estimated channel $\hat{h}_i$ using column vectors of the weight matrix W" of Equation (30) can be writtens:

$$\hat{h}_i = \begin{bmatrix} \hat{h}_{i1} \\ \hat{h}_{i2} \\ \hat{h}_{i3} \\ \hat{h}_{i4} \end{bmatrix} \quad \text{Equation (34)}$$

$$= a''w_1'' + b''w_2'' + c''w_3'' + d''w_4''$$

$$= a'' \begin{bmatrix} w_{11}'' \\ w_{21}'' \\ w_{31}'' \\ w_{41}'' \end{bmatrix} + b'' \begin{bmatrix} w_{12}'' \\ w_{22}'' \\ w_{32}'' \\ w_{42}'' \end{bmatrix} + c'' \begin{bmatrix} w_{13}'' \\ w_{23}'' \\ w_{33}'' \\ w_{43}'' \end{bmatrix} + d'' \begin{bmatrix} w_{14}'' \\ w_{24}'' \\ w_{34}'' \\ w_{44}'' \end{bmatrix}.$$

The UE acquires the values of a", b", c" and d" and an index of the column vector having the largest coefficient.

The UE transmits representative vectors (S260). When there are three weight matrixes, three representative vectors can be obtained for each weight matrixes. For example, let indexes 1, 2, 3, and 4 be sequentially given to the column vectors $w_1$, $w_2$, $w_3$ and $w_4$ of W. Let indexes 5, 6, 7, and 8 be given to the column vectors $w_1'$, $w_2'$, $w_3'$ and $w_4'$ of W'. Let indexes 9, 10, 11, and 12 be given to the column vectors $w_1''$, $w_2''$, $w_3''$ and $w_4''$ of W". Among the values acquired using Equations 32 to 34, it is assumed that a of a, b, c and d has the largest coefficient, b' of a', b', c' and d' has the largest coefficient, and d" of a", b", c" and d" has the largest coefficient. The vector $w_1$ of W is a representative vector of W, the vector $w_2'$ of W' is a representative vector of W' and the vector $w_4''$ of W" is a representative vector of W". Then, the UE can feedback the index 1 and the value a of the corresponding column vector, the index 6 and the value b' of the corresponding column vector and the index 12 and the value d" of the corresponding column vector. In the following description, the CSI fi is expressed as fi={(1,a), (6,b'), (12,d")} for the purpose of convenient expression.

In this way, the UE can transmit the CSI based on the basis which spans vector space of the weight matrix. Since the UE transmits the CSI at a time by using a series of weight matrixes, it is not necessary to transmit the CSI every when the BS changes the weight matrix. It is possible to reduce feedback overhead.

FIG. 9 is a flowchart illustrating a method for transmitting data according to an embodiment of the invention.

Referring to FIG. 9, the BS transmits a pilot signal (S310). The BS receives information for a plurality of representative vectors from UEs (S320). The UE transmits the CSI to the BS. For example, it is assumed that weight matrixes sequentially used in the BS is W, W' and W". The CSI comprises indexes and coefficients of the representative vectors in Equations (32) to (34). The BS schedules the UEs to which the transmission stream should be transmitted based on the CSI. The criterion for scheduling UEs can vary. For example, the UEs can be selected so that the UEs are most closely orthogonal to each other. The UEs can be schedules depending on the basis. For example, it is assumed that the number of transmitting antennas $N_T$ is 4 and the number of UEs in a cell is 6. The weight matrix W can be used as the weight matrix of UEs 1, 2, 3 and 4. The weight matrix W' can be used as the weight matrix of UEs 1, 3, 4 and 5. The weight matrix W" can be used as the weight matrix of UEs 2, 4, 5 and 6.

Signals are beam-formed and transmitted sequentially in accordance with the plurality of representative vectors (S330). For example, it is assumed that the CSI fi received from the i-th UE is fi={(1,a), (6,b'), (12,d")} and the i-th UE is selected by (6, b'). This means that the channel state of the i-th UE can be represented best by the second column vector $w_2'$ when the weight matrix W is used as a basis. The BS transmits a transmission signal x by applying the weight matrix W' to a transmission stream of the i-th UEs. The transmission signal x can be written as:

$$x = [w_1' w_2' w_3' w_4'] \begin{bmatrix} s_1 \\ s \\ s_3 \\ s_4 \end{bmatrix} \quad \text{Equation (35)}$$

where $s_1$, $s_3$ and $s_4$ are transmission streams for the other UEs.

It is assumed that the CSI fj received from the j-th user equipment is fj={(3,c), (5,a'), (11,c")} and the j-th UE is selected by (3, c). It is also assumed that the transmission stream of the j-th UE is q. Then, the BS transmits a transmission signal x which can be shown as:

$$x = [w_1 w_2 w_3 w_4] \begin{bmatrix} s_1 \\ s_2 \\ q \\ s_4 \end{bmatrix} \quad \text{Equation (36)}$$

where $s_1$, $s_2$ and $s_4$ are transmission streams for the other UEs.

In this way, since the BS need not transmit the weight matrix every time when the weight matrix is changed, it is possible to reduce feedback overhead.

FIG. 10 is a flowchart illustrating a method for transmitting CSI according to another embodiment of the invention.

Referring to FIG. 10, a UE prepares a basis representing the channel (S410). It is assumed that the number of transmission antennas $N_T$ is 4. Then, the estimated channel $\hat{h}_i$ of the i-th UE can be expressed by:

$$\hat{h}_i = \begin{bmatrix} \hat{h}_{i1} \\ \hat{h}_{i2} \\ \hat{h}_{i3} \\ \hat{h}_{i4} \end{bmatrix}. \quad \text{Equation (37)}$$

The UE selects a basis representing the estimated channel $\hat{h}_i$.

For example, the UE can select the column vectors of the weight matrix W as a basis. The estimated channel can be expressed by:

$$\hat{h}_i = \begin{bmatrix} \hat{h}_{i1} \\ \hat{h}_{i2} \\ \hat{h}_{i3} \\ \hat{h}_{i4} \end{bmatrix}$$
$$= aw_1 + bw_2 + cw_3 + dw_4$$
$$= a\begin{bmatrix} w_{11} \\ w_{21} \\ w_{31} \\ w_{41} \end{bmatrix} + b\begin{bmatrix} w_{12} \\ w_{22} \\ w_{32} \\ w_{42} \end{bmatrix} + c\begin{bmatrix} w_{13} \\ w_{23} \\ w_{33} \\ w_{43} \end{bmatrix} + d\begin{bmatrix} w_{14} \\ w_{24} \\ w_{34} \\ w_{44} \end{bmatrix}. \quad \text{Equation (38)}$$

The UE selects at least two representative vectors from the basis (S420). The criterion for selecting the representative vectors may be the order of coefficients. For example, it is assumed that the coefficient in Equation 38 decreases in the order of b, d, c and a. The vectors $w_2$ and $w_4$ are representative vectors. The column vector $w_2$ is a first representative vector of W and the column vector $w_4$ is a second representative vector of W. Compared with only one representative vector, it is possible to more accurately represent the estimated channel by choosing two or more representative vectors.

It is possible to completely transmit the estimated channel without any loss by using all column vectors constituting the weight matrix. However, such a method loses a meaning of the efficient CSI transmission. The fact that an UE uses all the column vectors means that the UE uses all the transmitting antennas. Thus the multi-user diversity has no gain. It is need that the CSI is transmitted using a proper number of column vectors among the column vectors constituting a basis.

The UE transmits the representative vectors as the CSI (S430). The CSI may be the indexes and the coefficients of the representative vectors. For example, when the indexes of the column vectors $w_1$, $w_2$, $w_3$, and $w_4$ of W in Equation (38) are sequentially 1, 2, 3 and 4 and $w_2$ and $w_4$ are selected as two representative vectors, the CSI fi={(2,b), (4,d)} can be transmitted.

Streams can be transmitted to the UE which requires necessarily a transmission while minimizing the interference. For example, an UE requires re-transmission in the HARQ or an UE requires the transmission due to the full of the buffer thereof. Since the channel information can accurately be represented, it is possible to effectively perform communications even when the number of UEs in a cell is small.

FIG. 11 is a diagram illustrating a basis and an estimated channel.

Referring to FIG. 11, it is assumed that x, y, and z vectors constituting the basis span three dimensional space. The estimated channel can be expressed by:

$$\hat{h}_i = \alpha x + \beta y + \gamma z. \quad \text{Equation 39}$$

For clarity, it is assumed that the order of coefficients is the order of α, β and γ and indexes of vectors x, y and z are sequentially 1, 2 and 3. Then, rather than the case where the estimated channel is represented using the index 1 of vector x and the coefficient α in the direction of vector x, the estimated channel can be accurately represented using the index 1 of vector x, the coefficient a in the direction of the vector x, the index 2 of vector y and the coefficient β in the direction of vector y.

The CSI may comprise an MCS index and a power offset value. The MCS index indicates one MCS selected from a predetermined MCS set. The SINR generally means a ratio obtained by selecting a vector having the largest coefficient and dividing the square of the coefficient of the vector by a value obtained by adding the sum of the squares of the coefficients of other vectors to the power of the noise. The continuous SINR can be optimized in the Gaussian modulation at the transmitter. However, the modulation is generally performed discretely and one modulation scheme among a set of several MCS is selected. More meaningful information of the actual transmitter may be a maximum MCS index and a power offset value for the maximum MCS index. The power offset value means an offset value which should be added to or subtracted from a reference transmission power in the transmitter. The CSI may not comprise the power offset value.

When the CSI is transmitted using two or more column vectors, various combinations are possible. For example, consider that three vectors from the given basis are selected. First, an UE can transmit the indexes of three vectors and the SINR values as the CSI. The number of actual values to be transmitted is 6 in total of 3 indexes of the column vectors and 3 values of the SINR. Second, the UE can transmit a MCS index, a power offset value and the indexes of three vectors as the CSI. The number of actual values to be transmitted is 5 in total of 3 indexes of the vectors, 1 MCS index and 1 power offset value. It can be seen that the number of values to be transmitted is reduced compared with the first scheme. Also, since range of the MCS index is generally narrower than that of the SINR, the less number of bits can be used. It is possible to reduce the actual data amount to be transmitted. When the MCS index and the power offset value are transmitted instead of the SINR, the interval for transmitting the CSI may be increase so that feedback overhead is reduced.

FIG. 12 is a diagram illustrating a method for transmitting CSI according to another aspect of the invention.

Referring to FIG. 12, a BS prepares a set of bases, not one basis. A basis is a weight. The BS uses unitary matrixes as weight matrixes.

For example, the number of bases in the set of bases may be three and the set of bases can be expressed as $B=\{W^1, W^2, W^3\}$. The bases $W^1$, $W^2$, $W^3$ can be selected randomly. The selection range of bases, that is, weight matrixes, can be widened. The order of bases to be used may be the order of $W^2$, $W^3$ and $W^1$ or the order of $W^3$, $W^1$ and $W^2$. The BS and UEs are aware of the set of bases and the order of changing the bases in advance. Alternatively, the order of weight matrixes can be notified from the BS to UEs.

FIG. 13 is a flowchart illustrating operations of the embodiment of FIG. 12.

Referring to FIG. 13, a set of bases representing an UE's channel is prepared (S510). The set of bases may be known to the UE. The set of bases may be a set of weight matrixes used in the BS.

The UE selects a representative vector from the set of bases (S520). When it is assumed that the number of transmitting antennas $N_T$ of the transmitter is 4, a i-th UE's estimated channel can be expressed by:

$$\hat{h}_i = \begin{bmatrix} \hat{h}_{i1} \\ \hat{h}_{i2} \\ \hat{h}_{i3} \\ \hat{h}_{i4} \end{bmatrix} \quad \text{Equation (40)}$$

A representative vector best matched with the estimated channel is found out of the set of bases. To find out the representative vector, one basis is not used, but a plurality of bases is used. The probability that the estimated channel is matched with the basis well can be improved.

Transformation of the estimated channel $\hat{h}_i$ using the weight matrix $W^1$ as the basis can be written as:

$$\hat{h}_i = \begin{bmatrix} \hat{h}_{i1} \\ \hat{h}_{i2} \\ \hat{h}_{i3} \\ \hat{h}_{i4} \end{bmatrix} \quad \text{Equation (41)}$$

$$= aw_1^1 + bw_2^1 + cw_3^1 + dw_4^1$$

$$= a\begin{bmatrix} w_{11}^1 \\ w_{21}^1 \\ w_{31}^1 \\ w_{41}^1 \end{bmatrix} + b\begin{bmatrix} w_{12}^1 \\ w_{22}^1 \\ w_{32}^1 \\ w_{42}^1 \end{bmatrix} + c\begin{bmatrix} w_{13}^1 \\ w_{23}^1 \\ w_{33}^1 \\ w_{43}^1 \end{bmatrix} + d\begin{bmatrix} w_{14}^1 \\ w_{24}^1 \\ w_{34}^1 \\ w_{44}^1 \end{bmatrix}$$

where $w_1^1$, $w_2^1$, $w_3^1$ and $w_4^1$ denote the column vectors of the weight matrix $W^1$. The UE acquires values of a, b, c and d and the index of the column vector having the largest coefficient. Values of a, b, c and d mean values obtained by projecting the estimated channel $\hat{h}_i$ onto the column vectors $w_1^1$, $w_2^1$, $w_3^1$, and $w_4^1$ of the weight matrix $W^1$ constituting the basis. The largest coefficient among a, b, c and d represents the estimated channel $\hat{h}_i$ most closely.

Transformation of the estimated channel $\hat{h}_i$ using the weight matrix $W^2$ as the basis can be written as:

$$\hat{h}_i = \begin{bmatrix} \hat{h}_{i1} \\ \hat{h}_{i2} \\ \hat{h}_{i3} \\ \hat{h}_{i4} \end{bmatrix} \quad \text{Equation (42)}$$

$$= a'w_1^2 + b'w_2^2 + c'w_3^2 + d'w_4^2$$

$$= a'\begin{bmatrix} w_{11}^2 \\ w_{21}^2 \\ w_{31}^2 \\ w_{41}^2 \end{bmatrix} + b'\begin{bmatrix} w_{12}^2 \\ w_{22}^2 \\ w_{32}^2 \\ w_{42}^2 \end{bmatrix} + c'\begin{bmatrix} w_{13}^2 \\ w_{23}^2 \\ w_{33}^2 \\ w_{43}^2 \end{bmatrix} + d'\begin{bmatrix} w_{14}^2 \\ w_{24}^2 \\ w_{34}^2 \\ w_{44}^2 \end{bmatrix}$$

where $w_1^2$, $w_2^2$, $w_3^2$ and $w_4^2$ denote column vectors of the weight matrix $W^2$. The UE acquires the values of a', b', c' and d' and the index of the column vector having the largest coefficient.

Transformation of the estimated channel $\hat{h}_i$ using the weight matrix $W^3$ as the basis can be written as:

$$\hat{h}_i = \begin{bmatrix} \hat{h}_{i1} \\ \hat{h}_{i2} \\ \hat{h}_{i3} \\ \hat{h}_{i4} \end{bmatrix}$$

$$= a''w_1^3 + b''w_2^3 + c''w_3^3 + d''w_4^3$$

$$= a'' \begin{bmatrix} w_{11}^3 \\ w_{21}^3 \\ w_{31}^3 \\ w_{41}^3 \end{bmatrix} + b'' \begin{bmatrix} w_{12}^3 \\ w_{22}^3 \\ w_{32}^3 \\ w_{42}^3 \end{bmatrix} + c'' \begin{bmatrix} w_{13}^3 \\ w_{23}^3 \\ w_{33}^3 \\ w_{43}^3 \end{bmatrix} + d'' \begin{bmatrix} w_{14}^3 \\ w_{24}^3 \\ w_{34}^3 \\ w_{44}^3 \end{bmatrix} \quad \text{Equation (43)}$$

where $w_1^3$, $w_2^3$, $w_3^3$ and $w_4^3$ denote column vectors of the weight matrix $W^3$. The UE acquires values of a", b", c" and d" and the index of the column vector having the largest coefficient.

The UE transmits an index of the representative vector and an index of the basis for the representative vectors (S530). The UE selects a representative vector having the largest coefficient from the set of bases. The UE transmits the index of the representative vector and the index of the basis for the representative vector to the BS. For example, if the fourth column vector of $w_4^1$ has the largest coefficient, the index of the basis for the column vector is 4 for the weight matrix $W^1$. The UE transmits the index 4 of the column vector and the index 1 of the basis for the column vector as the CSI. The CSI may include a coefficient of the representative vector.

The probability that the UE's channel is not matched with the basis is reduced in inverse proportion to the number of bases. The UE need not transmit the CSI every time when the basis used in the BS is changed. It is possible to prevent the waste of the channel capacity.

FIG. 14 is a flowchart illustrating a method for transmitting data according to another embodiment of the invention.

Referring to FIG. 14, a BS receives information based on a set of bases (S610). The information based on the set of bases may be an index of the basis best representing the UE's channel among the set of bases and an index of a representative vector of the basis. The information may also include a coefficient of the representative vector.

The BS schedules UEs to which a transmission stream should be transmitted based on the CSI (S620). The scheduling scheme may vary depending on a system. For example, the BS may select UEs which are orthogonal to each other most closely.

The transmission stream is sequentially beam-formed using the set of bases and transmitted to the selected UEs (S630). The transmission stream beam-formed using the weight matrix forms a multiplexed stream. The multiplexed stream is transmitted through a plurality of transmitting antennas. After a predetermined time elapses, the BS changes the basis and then selects UEs to which the transmission stream should be transmitted according the basis.

The probability that the UE's channel is not matched with the basis is reduced in inverse proportion to the number of bases. The BS need not transmit the weight matrix to the UE every time when the weight matrix is changed. It is possible to prevent the waste of the channel capacity.

FIG. 15 is a diagram illustrating a method for transmitting CSI according to still another embodiment of the invention. FIG. 16 is a flowchart illustrating operation of the embodiment of FIG. 15.

Referring to FIGS. 15 and 16, an UE receives a pilot signal (S710). The UE acquires an estimated channel by using the pilot signal (S720). It is assumed that the number of transmitting antennas $N_T$ of the transmitter is 4. The estimated channel of the i-th terminal can be expressed by:

$$\hat{h}_i = \begin{bmatrix} \hat{h}_{i1} \\ \hat{h}_{i2} \\ \hat{h}_{i3} \\ \hat{h}_{i4} \end{bmatrix}. \quad \text{Equation (44)}$$

The basis may be a weight matrix of the BS. When the number of transmitting antennas $N_T$ is 4, the weight matrix W can be expressed by:

$$W = [w_1 w_2 w_3 w_4] = \begin{bmatrix} w_{11} w_{12} w_{13} w_{14} \\ w_{21} w_{22} w_{23} w_{24} \\ w_{31} w_{32} w_{33} w_{34} \\ w_{41} w_{42} w_{43} w_{44} \end{bmatrix} \quad \text{Equation (45)}$$

where $w_i$ denotes a column vector. The weight matrix W is an unitary matrix.

The UE acquires a phase shift of the basis and a representative vector to represent the estimated channel (S730). Column vectors of the weight matrix W can be shifted in phase as:

$$W' = e^{j\theta_i} W = e^{j\theta_i}[w_1 w_2 w_3 w_4] \quad \text{Equation (46)}$$

where $\theta$ denotes a phase shift value.

Although the unitary matrix is phase-shifted, property of the unitary matrix remains as can be seen as:

$$(e^{j\theta_i} w_i)^H e^{j\theta_i} w_i = e^{-j\theta_i} w_i^H e^{j\theta_i} w_i = w_i^H w_i \neq 0,$$

$$(e^{j\theta_i} w_i)^H e^{j\theta_j} w_j = e^{-j\theta_i} w_i^H e^{j\theta_j} w_j = e^{-j(\theta_i - \theta_j)}(w_i^H w_j) = 0,$$

$$(i \neq j). \quad \text{Equation (47)}$$

A phase-shifted weight matrix W' can be also used as the basis. The phase shift value $\theta$ may be a predetermined value. Alternatively, the phase shift value $\theta$ may transmitted from the BS to the UE. The same phase shift value can be applied to all the column vectors constituting the basis. Or different phase shift value can be applied to each column vector.

When the phase shift is applied to the basis, the number of bases virtually increases as many as the number of bases which are shifted in phase. The UE selects not only a basis from the predetermined set of bases but also phased-shifted bases. As the selectable number of bases increases, the probability that the UE's channel is matched with the basis is increased.

The UE transmits an index of a representative vector of the basis and the phase shift of the basis as CSI (S740). The UE can feedback the index of the representative vector and the index of the phase change as the CSI to the BS.

It is possible to obtain various column vectors by phase shift. The probability of the mismatch between the actual channel and the column vectors can be reduced.

Here, we use column vectors to span a weight matrix which is a basis. But skilled in art can use row vectors to span the weight matrix. The column vectors are exemplary of vectors which span the basis.

A basis is directly not transmitted to an UE. The basis is predefined. It is possible to prevent a waste of the channel capacity due to the transmission of the basis. In addition, it is possible to reduce a mismatch between the actual channel and the basis. The waste of entire channel capacity can be prevented and the transmission efficiency can be enhanced.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims. Therefore, all changes and modifications that fall within the metes and bounds of the claims, or equivalence of such metes and bounds are intended to be embraced by the appended claims.

The invention claimed is:

1. A method for transmitting data in a multiple antenna system, the method comprising:
preparing a plurality of weight matrices for a plurality of antennas;
receiving information for a plurality of representative vectors which are selected for each weight matrix and represent channel information;
beam-forming a signal in accordance with the plurality of representative vectors using the plurality of weight matrices; and
transmitting the signal through the plurality of antennas.

2. The method of claim 1, wherein the information for the plurality of representative vectors are indexes of the plurality of representative vectors.

* * * * *